H. B. GARWOOD, F. H. GIBSON, C. S. BUDD, H. H. HILYARD & W. B. FOX.
GLASS WORKING MACHINE.
APPLICATION FILED JUNE 20, 1912.

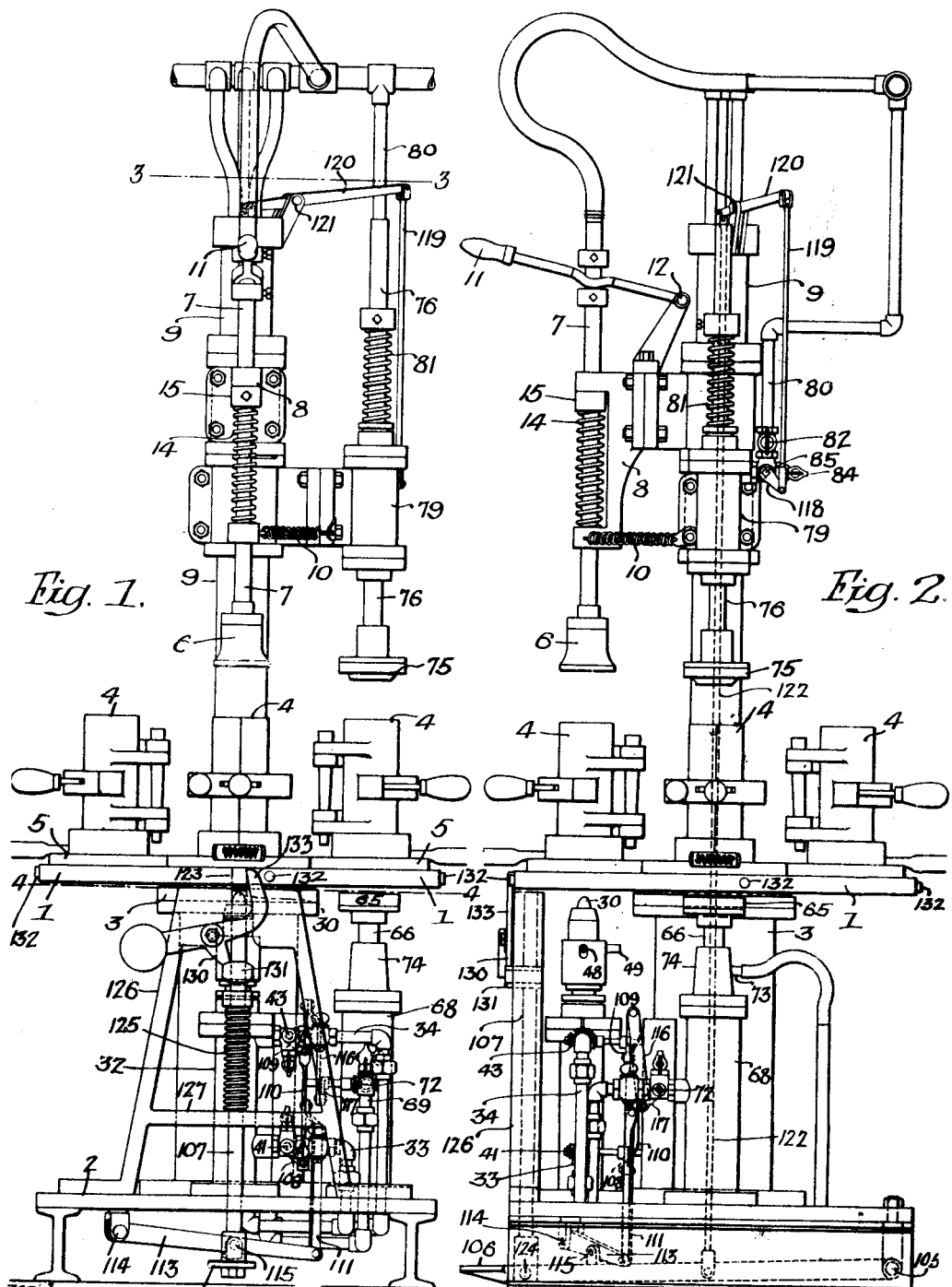

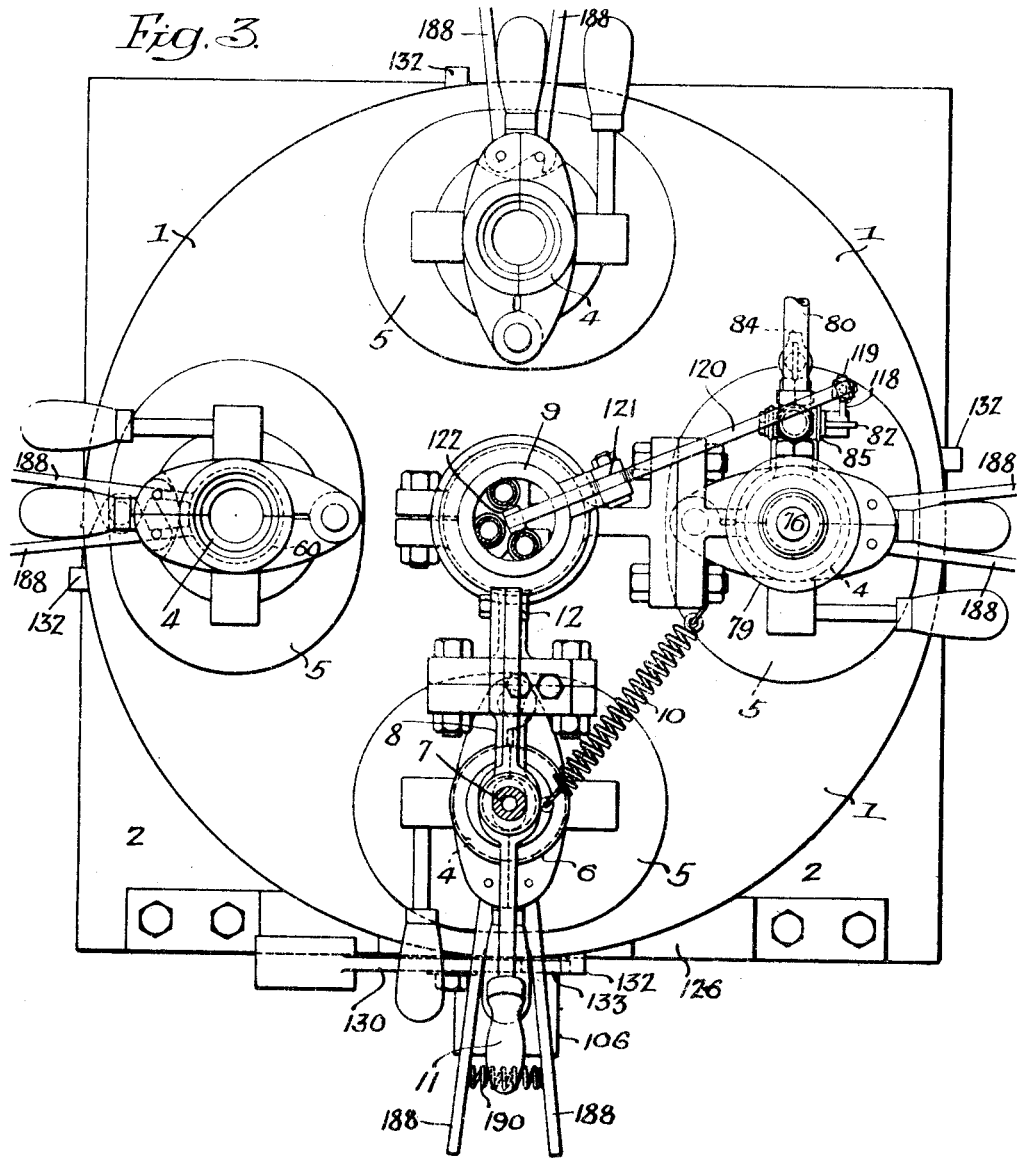

1,177,613.

Patented Apr. 4, 1916.
8 SHEETS—SHEET 3.

Inventors-
Herbert B. Garwood,
Frank H. Gibson,
Clinton S. Budd,
Harry H. Hilyard,
Ward B. Fox.
by their Attorneys

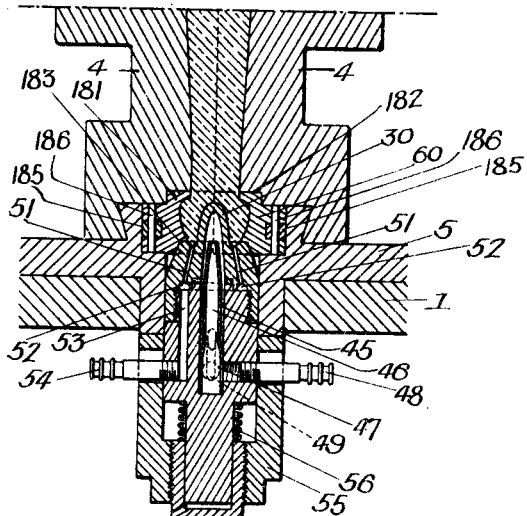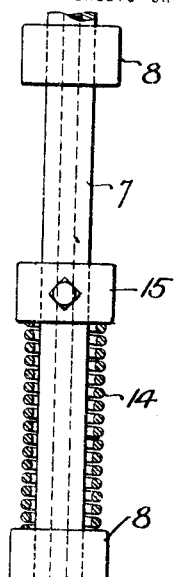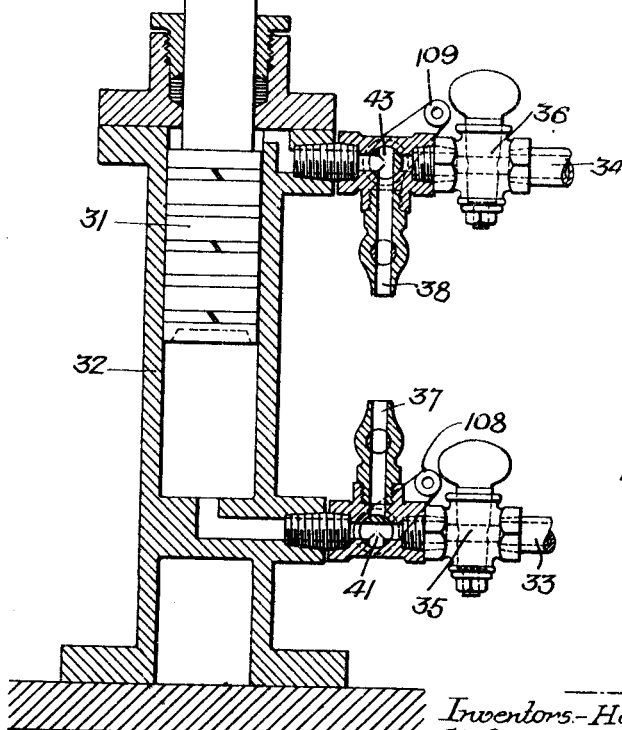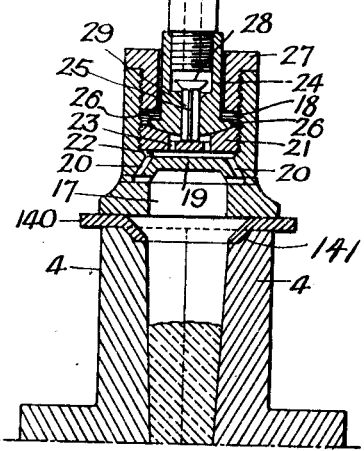

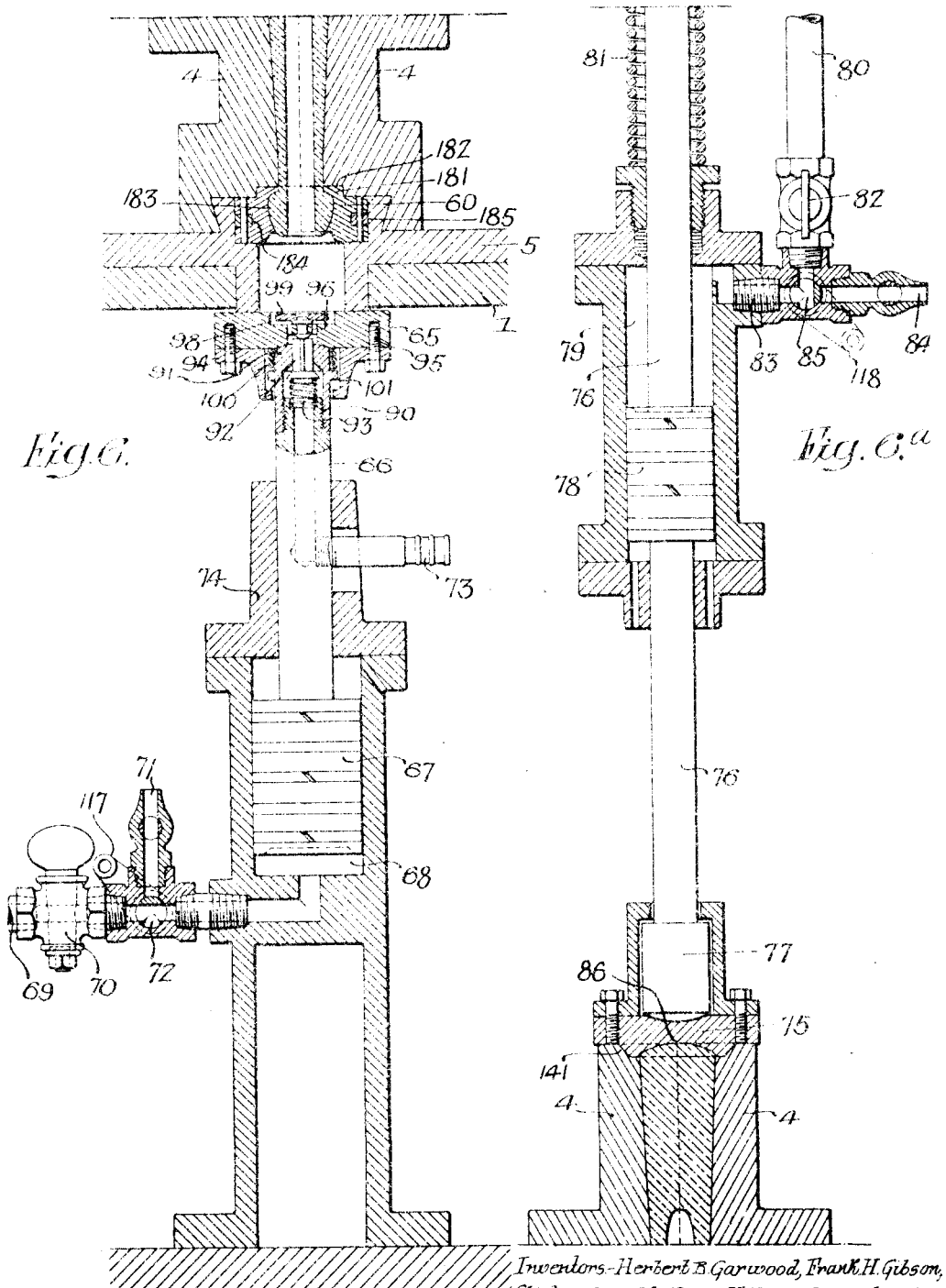

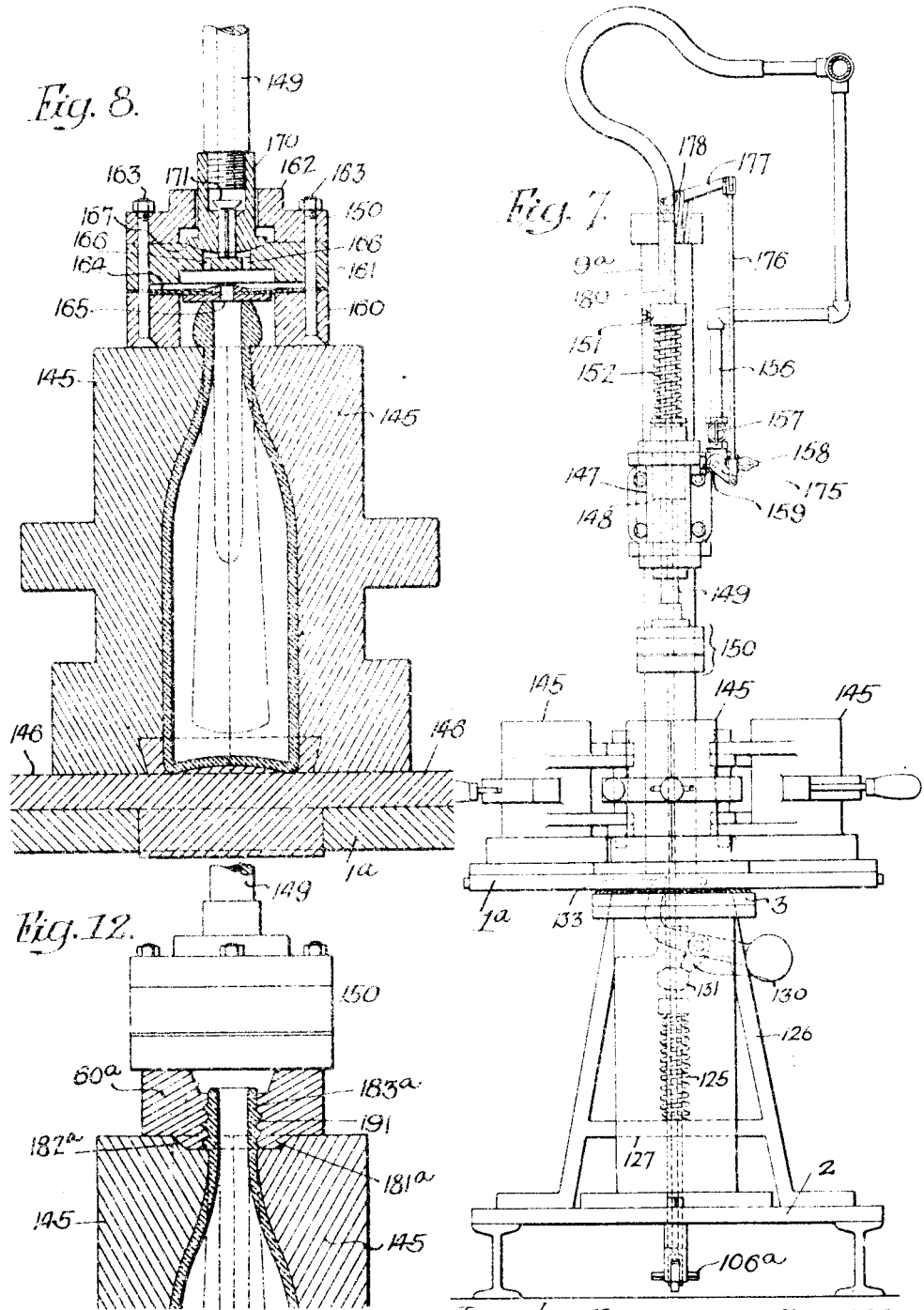

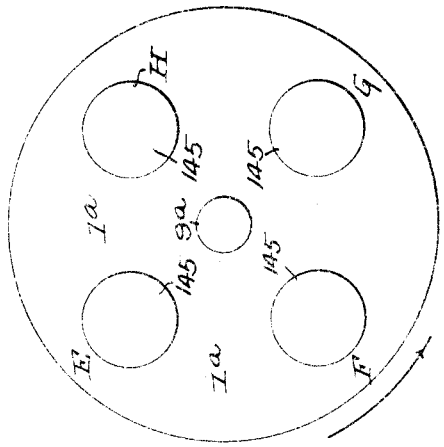
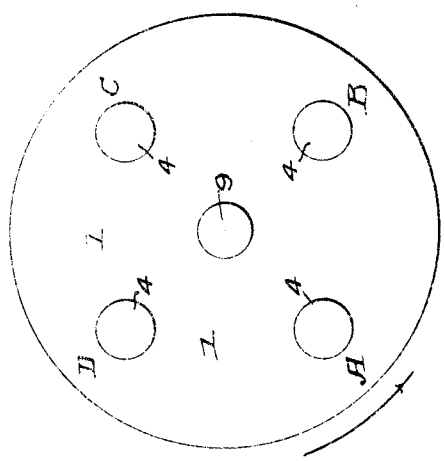
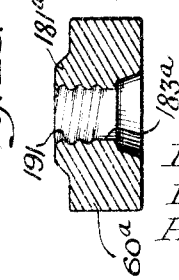
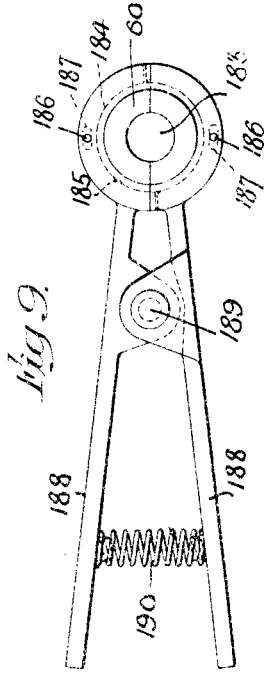
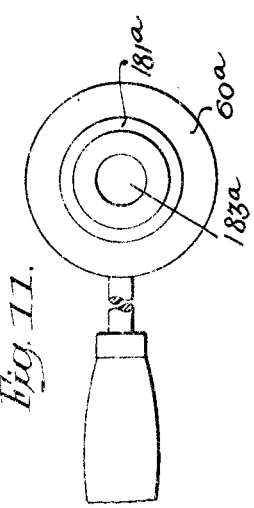

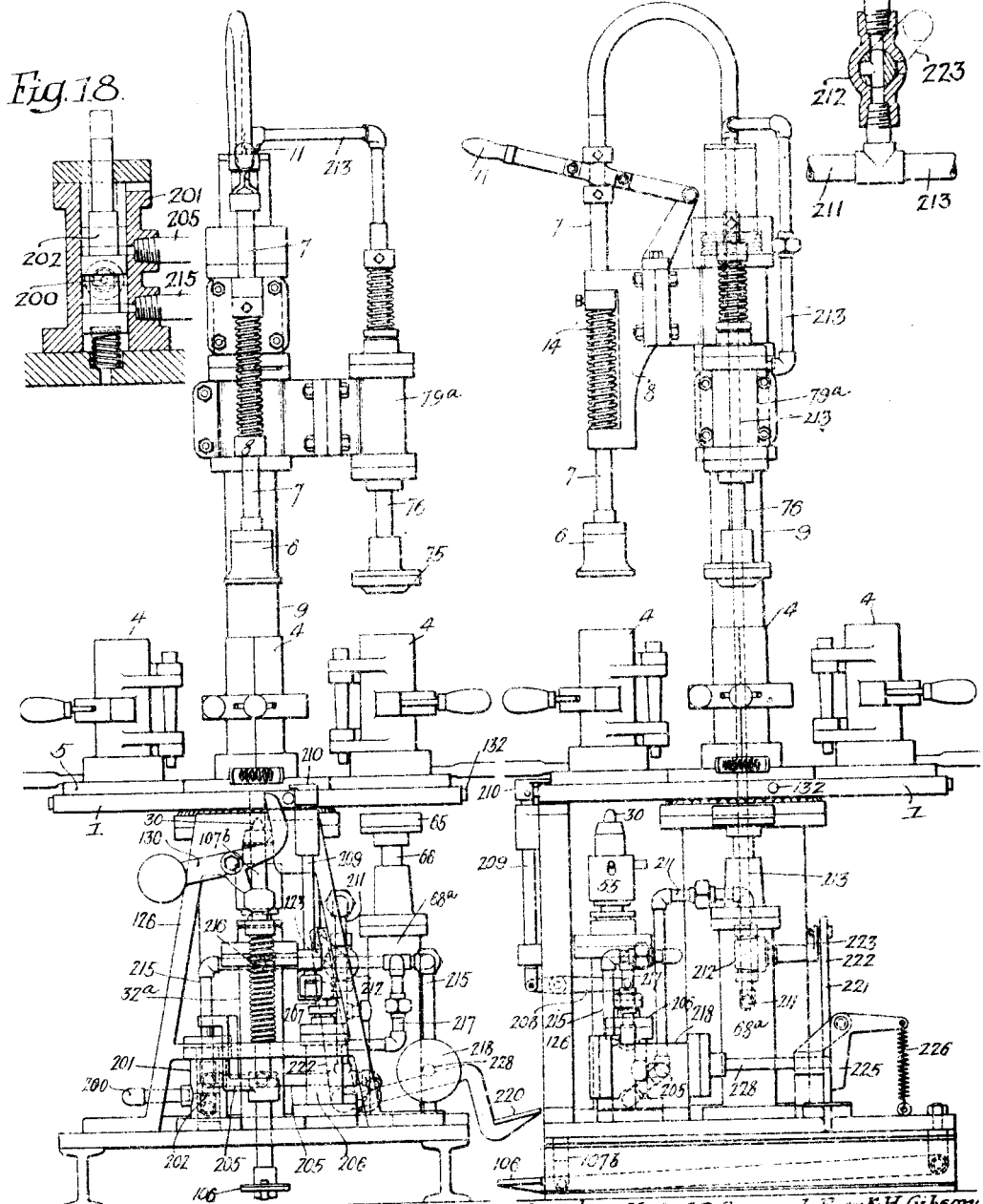

UNITED STATES PATENT OFFICE.

HERBERT B. GARWOOD, OF WILLIAMSTOWN, FRANK H. GIBSON, OF BRIDGETON, AND CLINTON S. BUDD, HARRY H. HILYARD, AND WARD B. FOX, OF WILLIAMSTOWN, NEW JERSEY, ASSIGNORS, BY MESNE ASSIGNMENTS, TO TWENTIETH CENTURY BOTTLE MACHINE CO., INC., A CORPORATION OF NEW YORK.

GLASS-WORKING MACHINE.

1,177,613. Specification of Letters Patent. Patented Apr. 4, 1916.

Application filed June 20, 1912. Serial No. 704,797.

*To all whom it may concern:*

Be it known that we, HERBERT B. GARWOOD, of Williamstown, Gloucester county, New Jersey; FRANK H. GIBSON, of Bridgeton, Cumberland county, New Jersey; and CLINTON S. BUDD, HARRY H. HILYARD, and WARD B. FOX, of Williamstown aforesaid, all citizens of the United States, have invented certain Improvements in and Relating to Glass-Working Machines, (the same being in part a division of our application filed December 14, 1911, Serial No. 665,663,) of which the following is a specification.

Our invention relates to the manufacture of hollow glassware, and the object of our invention is to provide an improved form of apparatus for producing hollow glassware with a minimum amount of power and labor.

Our invention comprises certain improvements in machines employed in the manufacture of hollow glassware; the object of our invention being to provide improved means for automatically forming a blank and subsequently developing the same to the desired finished shape and size by the application of air or suitable fluid under pressure to the glass while disposed in suitable molds.

The improved apparatus forming the subject of our invention, relating to the manufacture or formation of hollow glass articles with narrow necks or heads too small to permit the pouring of glass at the neck or head end of said mold, is particularly adapted to the manufacture of narrow necked bottles. The present method of forming bottles of this character is to suck the glass into the mold to form during such sucking operation an initial cavity in the head end of the blank which is subsequently enlarged while in the blank mold and finally blown to form the interior of the bottle or other article of hollow glassware in process of manufacture.

Figure 4:
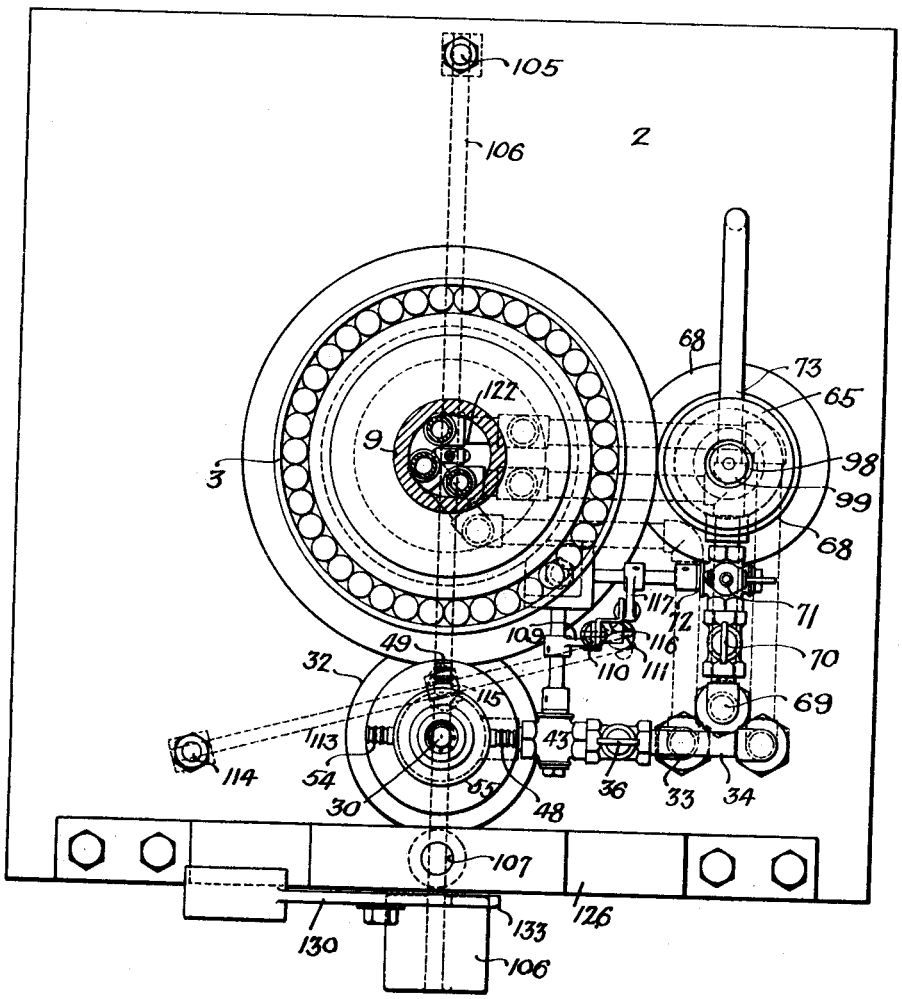
Figure 15:
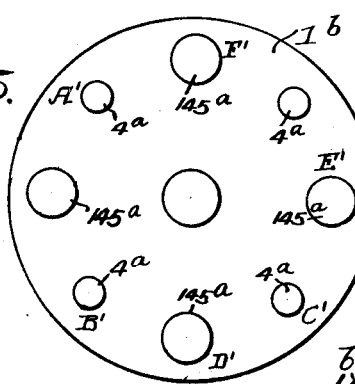

Our invention is more fully described hereinafter, reference being had to the accompanying drawings illustrating glass working apparatus having and containing the improvements forming the subject of our invention, in which:

Figure 1, is a front elevation of a glass working machine made in accordance with our invention; such machine being designed for the purpose of preparing the blank or parison; Fig. 2, is a side elevation of the same; Fig. 3, is a sectional plan view on the line 3—3, Fig. 1; Fig. 4, is a sectional plan view on the line 4—4, Fig. 1; Figs. 5 and 5ª, represent an enlarged sectional elevation of a parison or blank mold and the operating mechanism employed in connection therewith, in the primary position; Figs. 6 and 6ª, represent an enlarged sectional elevation of a parison or blank mold employed in finishing the blank, in the secondary position; Fig. 7, is a front elevation of the mechanism employed for blowing the blank or parison to finished shape; Fig. 8, is an enlarged sectional view of the blow mold; Fig. 9, is a view of a separable neck-ring which may be employed with the blank or parison molds; Figs. 10 and 11, are views of a solid neck-mold having a threaded inner wall; Fig. 12, shows the solid neck-ring in position with respect to the blow mold; Figs. 13 and 14, are diagrammatic views of the tables or carriers for the blank and blow molds, respectively; Fig. 15, is a diagrammatic view of a table or carrier for both blank and blow molds; Fig. 16, is a front elevation similar to Fig. 1, showing a modified construction of the mechanism employed in the construction of the blanks or parisons; Fig. 17, is a side elevation of the same. Fig. 17ª is a sectional view illustrating a detail of the structure shown in Fig. 17, and Fig. 18, is a sectional view of a master valve.

In machines of the Owens type, the glass to form the blank or parison is gathered into the mold by suction; the suction created giving such parison a finished head or neck portion, which parison, upon subsequent introduction into the blow mold, is developed by the usual pressure into a finished bottle or other article of hollow glassware.

In carrying our invention into effect, we may gather by hand and introduce into a mold, which may be termed the parison or blank mold, sufficient glass to form the desired parison, and this quantity may be readily judged and is largely determined by the bore of the mold which is always of sufficient size to contain the quantity of glass desired. Immediately after the glass has been introduced into this mold and while the latter is in the primary position as illustrated in Figs. 5 and 5ª, a source of fluid under pressure, preferably air, is connected therewith; such air being introduced at the top of the same; the mold being shown in the inverted position with the head and neck-forming portion at the bottom. Before the introduction of the charge of glass, a core is introduced into the mold at the head or neck end of the same; being disposed axially of the neck-ring carried thereby. Fluid pressure being turned on, the glass in the mold is forced into the lowered head end of the same and into a neck-ring or mold alined therewith and surrounding the plunger or core whereby the finished head, neck and mouth of the bottle are formed; the glass cooling sufficiently at this part to insure the retention by the same of the head and mouth formation of the neck-ring or mold.

In addition to the pressure applied to the upper portion of the charge of glass to press the same into the blank mold and neck-mold, we provide means whereby suction is applied to said neck-mold so that there will not only be no obstruction to the glass fully entering such head and neck-mold, but assistance will be given the same to effect the desired formation. The mold with the several elements carrying the glass blank is then shifted to a second position; a suitable plate is set over the top of the mold, and pressure is introduced into the mouth of the partly-formed parison or bottle blank, the effect of which is to enlarge the cavity initially formed by the core and complete the formation of the parison by forcing the glass against the plate overlying the mold. This plate may have a rounded recess to give the end of the parison a curved contour, although this is not essential. The parison is now removed from the blank mold and introduced into the blow mold, being supported therein by the neck portion which has been dislodged or removed from the neck-mold, and air being forced into said blank or parison while in said blow mold, said parison will be blown to the desired final shape of the bottle or other article of hollow-ware. It will be seen therefore that air is first introduced at one end of a mold to force the glass around a core and form the finished head, neck and mouth of the bottle or other article of hollow-ware, and that the subsequent application of air is to the interior of the blank or parison.

Referring to Figs. 1 and 2, 1 represents a suitable rotating table mounted upon a base 2, which may be fixed; a ball bearing support for the table being indicated at 3 and disposed between said base and table whereby the latter may be readily moved. Carried by this table 1 is a series of blank or parison molds 4, which may be of the usual or ordinary construction, having the usual means employed to keep them closed, and disposed in engagement with apertured plates 5 carried by said table 1. Into these molds the glass is poured by the gathering boy until the required amount is present. While this is being done, a closure 6 for the mold subsequently employed during the initial pressing operation, which closure is carried by a stem 7, supported by a bracket 8, pivotally mounted on a central stem 9 of the machine, is to one side of the mold under pressure exerted by a spring 10. As soon as the mold receives the desired quantity of glass, the operator grasps a handle 11 in operative engagement with the stem 7 and pivotally connected at 12 to the bracket 8, swinging said stem 7 into axial alinement with the mold and depressing the same against the tension of a spring 14, carried on the stem 7 between a portion of the bracket 8 and a collar 15 fixed to said stem 7.

When the closure 6, previously centered over the blank mold, has been lowered into contact therewith, pressure to force the glass to the lower part of said mold is automatically turned on. This is effected in the following manner: The head or closure 6 has an inverted cup-shaped portion 17, and a socketed portion 18; such portions being separated by a fixed diaphragm or web 19, having openings 20, and a movable diaphragm or web 21, which may be threaded into place and spaced a slight distance above the diaphragm 19 whereby a chamber 22 is formed. The diaphragm 21 has openings 23 communicating with the chamber 22. The socketed portion 18 receives a head 24 carrying a valve 25; said head 24 having slight movement within the socketed portion so that when the structure is in the raised, inactive, position the valve will be closed by the pressure. This valve opens by contact with the diaphragm 21, and the lower end of said head may be rounded for close engagement with a rounded surface formed on the upper side of said diaphragm 21 to insure against leakage. The head 24 is shouldered at 26, and a gland nut 27 is provided to retain said head in place in the socketed portion 18. The openings or apertures 20 and 23 are provided for the passage of air, and by reason of their position the force of the pressure will be spread over a larger area without reducing the volume, thereby preventing injury to the glass. The valve 25 is of ordinary construction, with a head 28 and grooves 29 formed at the sides of its stem for the passage of air when raised from its seat by contact with the diaphragm or web 21.

Below the table and adapted to move through a suitable aperture in the same receiving the plate 5 is a core 30 controlled by a piston 31 in a cylinder 32, into which cylinder motive fluid may be introduced via the pipes or conduits 33 and 34, which pipes are valved at 35 and 36, respectively;

said pipes being also provided with suitable exhaust outlets 37 and 38, respectively, which are preferably provided with pet cocks whereby the rapidity of exhaust may be controlled to prevent sudden jar in the operations of the piston. In addition, three-way valves 41 and 43 are provided, which are operated in unison, so that when one is open for the admission of fluid under pressure to operate the piston in one direction or the other, the other valve is open to the exhaust.

The head of the piston rod carrying the core to form the initial opening in the parison or blank mold is provided with means for supplying a cooling fluid to such core and with means for effecting suction upon the glass within said mold to draw the same into the neck-mold.

Disposed within a hollow chamber 45 within said head is a tubular member 46; the lower end of which is apertured at 47 for the passage of a cooling fluid entering via a tube 48 suitably connected to a source of supply, which cooling fluid is flowing all the time. The tubular member 46 is less in diameter than the chamber receiving the same so that such cooling fluid after performing its work descends outside the tubular member 46 and may find exit through an opening 49, connected to suitable drainage means. The upper portion of this head directly surrounding the core is shaped to form the mouth of the bottle, and communicating with this portion are passages 51 which open into a common annular passage 52 communicating via a passage 53 with a hollow stem 54 suitably connected to a source of vacuum, which is constant.

Surrounding the head is a suitable shell 55, and between head and the piston rod is a spring 56 whereby slight movement of such parts with respect to each other is provided; such spring serving to insure the seating of the head against the neck-mold. This neck-ring or mold, indicated at 60, is combined with the blank mold, being a separable and separately removable structure, and disposed concentric with respect to the parison or blank mold, the cavity forming core 30 being axially disposed with respect to said neck-ring or mold.

The pressure of air passing through the hollow stem 7 forces the glass within the parison or blank mold into the lower part of the same, as shown in the drawings, and into the neck-ring or mold and around the cavity forming core, being assisted by vacuum present at such point, thus forming the head and neck of the finished bottle or other article of hollow-ware and the initial portion of the cavity subsequently enlarged in the following operations necessary to form the finished bottle.

In Figs. 6 and 6ª, we have shown the means for completing the formation of the parison in the parison or blank mold. For this purpose, the table 1 is given a quarter turn to move the blank mold into a second position where it registers with means for completing the parison.

The mold is still in the inverted position, as shown in Figs. 5 and 5ª, and a blow-head 65 has been brought into position to cover the opening in the plate 5 carried by said mold table and underlying said blank mold; such blow-head being connected by a flexible joint to a hollow piston rod 66, which is raised by a piston 67 within a cylinder 68, into which motive fluid may be introduced via the pipe 69. This pipe 69 is provided with a suitable cut-off valve 70 controlling the inlet of the motive fluid; has an exhaust opening 71 controlled by a suitable pet cock, and is provided further with a three-way valve 72 for controlling the inlet and exhaust from said cylinder; said valve 72 being operated in unison with the valves 41 and 43.

The hollow piston rod carries a stem 73, connected to a suitable source of pressure, and a sleeve cap 74 carried by the cylinder 68 may be slotted to permit movement of the same. Air under pressure passes from said stem 73 through said hollow piston rod 66 to the blow-head 65, and thence to the glass within the blank mold, enlarging the cavity or recess in the end of the same initially formed by the core, and lengthening the mass of glass to form the complete or finished parison, subsequently blown. When pressure in engagement with the piston 67 and tending to hold the blow-head up against the bottom of the table is relieved, the said blow-head drops by gravity.

When in the position shown in Figs. 6 and 6ª, the upper end of the blank mold is covered by a plate 75, connected to a piston rod 76, by a loose joint 77; the piston rod being controlled by a piston 78 within a cylinder 79, to which motive fluid under pressure may be admitted through a pipe 80 to lower said piston; a spring 81 being employed to raise the piston rod when pressure tending to lower the same is cut off. The pipe for delivering pressure to this cylinder, indicated at 80, is provided with a suitable controlling valve 82; said pipe being connected to a stem 83 attached to the cylinder, and said stem having an exhaust aperture 84 controlled by a suitable pet cock, while the stem is further provided with a three-way valve 85 for controlling the inlet and exhaust to and from the cylinder; which valve is operated in unison with the valves 41 and 43, and the valve 72.

The plate 75 may have a rounded recess 86 on its under side registering with the bore of the blank mold, into which recess the glass is forced by the pressure applied from below. The action of the plate 75 is substantially automatic; being self-centering when lowered, and being automatically raised by the spring 81 when the pressure holding down the piston rod 76 is relieved.

The upper end of the piston rod 66 is reduced and threaded at 90 for the reception of a cap piece 91 having a central opening or aperture receiving a valve 92, which valve is maintained in the closed position, when the piston rod is lowered, by means of a spring 93. Disposed exteriorly of this cap member is a ring 94 which may be attached by means of bolts 95 to the plate 65; the latter having passages 96 for the inlet of air communicating with the valve opening formed in the cap member. It is desirable that the air be baffled before entering the recess in the blank or parison, and for this purpose the plate 65 may be centrally recessed at 98 and carry an axially disposed disk 99 which lies normally over the passages 96 in said plate so that the incoming charge of air will be diverted in its flow, and while the volume and pressure of such air is not cut down, its initial force is subdued to a certain extent. To raise the plate 65 from the top of the piston and close the valve 92 to cut off the flow of air from the hollow piston rod, we may provide a spring 100 encircling the cap member and interposed between a shoulder 101 on the same and said plate 65.

For the purpose of operating the three-way valves 41, 43, 72 and 85, whereby the several parts of the mechanism carried by the blank mold machine may be operated in proper relation and order, the following means are provided. Pivoted at 105 to the base of this machine is a foot treadle 106, to which is connected a series of links and levers whereby all of said valves, together with a locking bolt 107 for retaining the rotating table 1 in the desired position, may be operated. The valves 41 and 43 have operating arms 108 and 109 connected by a link 110, which is in turn connected by a link 111, with a lever 113 pivoted to the base plate at 114 and connected at 115 to said foot treadle 106. The link 110 is extended above the connection with the arm 109, and connected thereto is a link 116, the lower end of which is connected to an arm 117 of the three-way valve 72. The three-way valve 85 is provided with an arm 118 connected by means of a link 119 with a lever 120 pivoted at 121 to the central stem 9 of the machine; the opposite end of said lever being connected by means of a link 122 with said foot treadle. In addition, the locking bolt 107 adapted to enter apertures 123 in the rotating table is connected to said foot treadle at 124; said rod having a spring 125 which serves to keep the foot treadle in the elevated position and the locking bolt in place; said bolt being mounted in a suitable frame 126, a portion 127 of which forms an abutment for said spring. Upon depressing the foot lever 106, the several valves 41, 43, 72 and 85, will be operated and the bolt 107 will be withdrawn from the table 1. The table may then be turned by hand, and the mold carrying the partially finished blank or parison brought to the secondary position. Upon depression of the locking bolt, a pivoted latch 130, which is weighted, drops and engages the collar 131 on the locking bolt and holds the latter out of engagement with the table. When the table nears the end of its movement, however, a pin 132 at the marginal edge of the same engages the hooked end 133 of said latch and moves the same on its pivot so as to release the locking bolt 107, which action throws the latter against the under side of the table, and when an aperture 123 to receive the bolt comes into registry therewith, said bolt will enter therein, being impelled to such position by means of the spring 125 before referred to. Immediately after the table has reached this new position, the core 30 is raised into the neck-ring lying in the bottom of the succeeding blank mold, making the same ready to receive a charge of glass, and plate 65 has been lifted into its proper position with respect to the blank mold moved to the secondary position, ready for the completion of the partially recessed parison or blank therein, and at the same time the upper plate 75 has been dropped so as to form the abutment against which said blank is pressed during the operation of completing the recessing of the same.

It is desirable that the top of the blank molds be kept clean and free from any strings and droppings of glass, and for this purpose we provide a funnel plate 140 through which the charges of glass are passed; the upper end of said molds being depressed at 141 to properly receive the same. After the parison has been finished, it may be lifted by the neck-ring 60 and introduced into one of the blow molds 145, the latter having separable bottoms 146; said blow molds being carried by a table 1ª. When the parison has been disposed in a blow mold, it is ready to be blown, and a blow-head, constructed and operated in the following manner, is provided: Axially disposed above one of the said blow molds is a cylinder 147, having a suitable piston 148 to which is attached a piston-rod 149, carrying at its lower end a blow-head 150. Said piston-rod passes entirely through the cylinder, and the upper end is provided with a collar 151 between which and the cylinder head a spring 152 is provided for the purpose of raising said piston-rod and blow-head when the pressure upon said piston and tending to lower the same is cut off. The cylinder receives its motive fluid from a pipe 156, having a suitable controlling valve 157, with an exhaust outlet 158 controlled by a suitable pet cock; a three-way valve 159 controlling the inlet and exhaust of the motive fluid to and from said cylinder. When the blow-head is lowered, pressure enters the same via the piston-rod 149; the latter being hollow. The said blow-head is a sectional structure comprising a ring 160 for engagement with the mold structure, an upper cover member 161, and a retaining collar 162; said parts being held together by suitable means such as bolts 163. Between the parts 160 and 161 a diaphragm 164 is disposed having an aperture 165 which is axially arranged with respect to the bottle neck; said diaphragm being made of a plurality of metal pieces and slightly flexible so that under the pressure of air it will engage the head of the bottle and hold the same against danger of rising, due to pressure within the bottle reacting against the bottom of the same and tending to elongate the neck.

The cover member 161 is provided with a plurality of apertures 166 concentrically arranged with respect to the aperture 165 formed in the diaphragm 164, and the upper side of this cover member is recessed or hollowed at 167 for engagement by the end of the piston-rod, which end is a separable member 170 carrying a valve 171 and threaded onto said piston rod. The blow-head is movable with respect to the end of the piston-rod, being confined by the collar 162, and the connection being a loose one, and the valve, of ordinary type, which opens when the blow-head is seated, closes automatically when said blow-head is lifted.

To control the lowering of the blow-head, the valve 159 is provided with an arm or handle 175, connected by means of a link 176, with a lever 177, pivoted to a bracket 178, carried by the main stem 9ª of the machine; the opposite end of said lever being connected by a link 180 to a treadle 106ª. The table 1ª is also provided with the locking means referred to with respect to the table 1 carrying the blank molds, with a latch controlling the same; this part of the mechanism being operated in a similar manner.

The separable neck-ring 60 which we may employ consists of an annular member split through its center to permit the removal of the head and neck of the finished parison after the same has been transferred from the parison mold 4 to the blow mold 145. The said ring 60 has a raised portion 181 which projects into an annular recess 182 formed in the mold 4 to insure a tight fit between these parts. The ring 60 also has a central opening 183 into which the core 30 projects. An annular groove 184 is also formed in said ring for the reception of a split collar 185, held in place by pins 186 passing through slotted openings 187 in said collar 185. Each half of the collar 185 carries an arm 188, and these arms are pivotally connected together by a pin 189; a spring 190 being disposed between said arms to keep the neck-ring tightly closed. The slotted openings 187 allow a slight movement of the halves of the neck-ring 60 to insure a perfect fit at the joining of the said ring. The split collar 185 is cut at a slight angle with respect to the cut in the neck-ring, the ends of said collar 185 extending across the cut in the neck-ring to insure proper alinement of both halves of the same.

In lieu of a split neck-ring or mold such as that shown at 60, in Figs. 5, 6 and 9, we may employ a solid ring 60ª, such as shown in Figs. 10, 11 and 12, having a central opening 183ª threaded at 191 for the formation of externally threaded necks upon bottles. When this form of neck-ring or mold is employed, it is retained with the blank or parison until the same is blown to the finished shape, and hence the blow-head for blowing the bottle contacts with said neck-ring or mold, as clearly shown in Fig. 12. In order to center this form of neck-ring properly with respect to the blow mold, we prefer to provide the same with an annular raised portion 181ª adapted to engage an annular recess 182ª formed in the top of the blow mold. After the bottle has been blown and before it is removed from the mold to be taken to the annealing leer, an attendant can readily remove the neck-ring by turning it off the threaded portion of the bottle neck.

In Figs. 16 and 17, we have shown a modified form of means for controlling the passage of motive fluid to the several cylinders to carry out the different operations of the machine. A main air supply pipe is indicated at 200, and is shown in communication with a casing or cylinder 201 containing a master valve 202. When the blank or parison molds are in proper position to receive and work the charges of glass, the locking bolt 107ᵇ rises, carrying with it the piston or valve 202 located in the casing or cylinder 201. When in this position, air is free to flow from the main air pipe 200 through a pipe 205, into the bottom of the cylinder 32ª, thereby raising the head 55, core 30, etc., also to the bottom of a cylinder 206, thereby raising its piston and a piston rod 207, which latter is connected to a lever 208 pivoted to the frame 126 and having its other end connected to a bar 209 mounted in bearings on the frame, carrying at its upper end a flanged collar 210 which bears down against the table 1. Through this mechanism, the table is kept from rising due to the pressure present in the several cylinders for raising their respective pistons, etc. The pipe 205 has a branch 211 which delivers air to the bottom of the cylinder 68ª, through a three-way valve 212, for purposes hereinafter described, and to the upper end of the cylinder 79ª through a pipe 213 connected to said pipe 211, thereby raising the plate 65 and its associated parts, and also lowering the plate 75 through the medium of the piston and piston-rod 76.

When the locking bar 107ᵇ is lowered, it carries with it the piston or valve 202 located in the casing or cylinder 201 and permits the air flowing from the pipe 200 to pass to a pipe 215 and thence to the upper end of the cylinder 32ª, via a branch 216, thereby lowering the core 30, etc., and by a branch 217 to the upper end of the cylinder 206, thereby lowering its piston, etc., and raising the flanged collar 210 out of contact with the table 1, permitting the same to be turned. Air is also admitted to a cylinder 218 for purposes hereinafter described. The air is also exhausted from the lower end of the cylinder 68ª, allowing the plate 65 to be lowered by gravity, clear of the table 1, the air exhausting from the upper end of the cylinder 79ª at the same time, thereby raising the cover plate 75 from the mold 5.

When it is desired to remove the parison occupying the position over the cylinder 68ª before the boy has withdrawn the bolt 107ᵇ, the boy presses a treadle 220, which forms one end of a bell crank lever 221, the other end 222 of which is connected to an arm 223 of the three-way valve 212, thereby turning said valve, exhausting the air from the cylinders 68ª and 79ª, but not interfering with the other cylinders in any manner. After the treadle 220 has been depressed, a latch 225, through the action of a spring 226, drops on top of said treadle; holding it down, leaving the cylinders 68ª and 79ª open to exhaust through the said three-way valve 212. When the attendant lowers the locking bar 107ᵇ after completing the charging and working of the glass occupying the position over the cylinder 32ª, air is allowed to flow to one end of the cylinder 218, forcing its piston, and the rod 228 connected thereto forward, the end of said rod striking the latch 225, releasing the treadle 220, allowing the same to raise, thereby returning the three-way valve 212 to its normal position. This mechanism, controlled by the treadle 220, is only used in case of emergency. Should the boy be delayed in charging the mold over the cylinder 32ª, the treadle is depressed, exhausting the air from the cylinders 68ª and 79ª, withdrawing their respective heads, the mold is opened and the neck-ring carrying the finished parison is taken out, and parison being placed in the blow mold, and then blown to a finished bottle.

The operation of the machine is as follows: The table 1 is turned until one of the parison molds axially registers with the core 30, (position "A", Fig. 13,) and is locked in said position by the bolt 107 entering of the holes 123 in said table 1, said bolt being automatically released from its inoperative position by one of the pins 132 on the periphery of the table 1, striking the hook end 133 of the latch 130. The core 30 is raised and enters the bottom of the neck-ring 60, and then an operator places the funnel 140 over the mouth of the mold. The gathering boy then drops a charge of glass into the mold, said charge being cut off by a second boy who catches hold of the handle 11, thereby swinging the closure 6 over the mold and bringing it down into contact with the top of the latter at the same time; by so doing the air pressure is applied to the upper end of the mold, forcing the glass down around the core and into the neck-ring, the vacuum aiding by drawing the glass down from below, thereby finishing the head and neck portion of the bottle. The cutter boy then releases his hold on the handle 11, allowing the closure to be raised by the spring 14, the spring 10 at the same time swinging said closure to one side of the mold so as not to interfere with the charging of the next mold. During this operation, the cutter boy presses the treadle 106, thereby withdrawing the bolt 107 from the table; the latch 130 dropping on the top of the collar 131, thereby holding said bolt down clear of the table, also operating the valve 41 to cause the air to exhaust from the bottom and operating the valve 43 to permit passage of air to the top of the cylinder 32, thereby moving the core 30 down clear of the bottom of said table 1. The operator then removes the funnel 140, the table is then moved so that the next empty blank mold registers with the core 30, the blank mold carrying first the charge of glass passing to the second position, (B, Fig. 13). During the charging of the second blank mold, at position A, the plate 65 is raised into contact with the bottom of the blank mold in position B, opening the valve 92 in the head-piece 91, carrying said plate, and permitting the passage of air delivered by the stem 73. At the same time, the cover plate 75 is lowered into contact with the top of said mold. The air admitted to the hollow shaft 66 passes through the plate 65 and into the lower cavity of the mold below the neck-ring 60, thereby forcing the glass up to the top of the mold against the cover plate 75; also lengthening the cavity in the parison. The table is then turned as before described, and the blank mold passes to a third position, (C, Fig.

13,) at which the mold is opened, by a boy who removes the neck-ring 60 carrying the parison, and places the same in a blow mold carried by the table 1ª, (position E, Fig 14). The boy rests the neck-ring on the top of the said blow mold 145, closes the latter around the parison, and then removes the neck-ring, placing the same in a parison or blank mold which may be one of the molds 4, at position "D", Fig. 13. Said mold is closed at the same time and then it is ready to be recharged after being moved to position "A". When the boy removes the neck-ring, the top of the blow mold encircles the neck of the parison, the head of which extends above the blow mold 145, with the body portion hanging inside the same. The boy then presses down the foot treadle on the blow machine withdrawing the bolt, etc., and moves the table to position F, Fig. 14. When the mold reaches this position, the bolt automatically locks the table, at the same time air is admittted to the top of cylinder 148 forcing the blow-head down on top of the mold. The valve 171 is automatically opened and air is allowed to pass through the diaphragm 165 and into the cavity formed in the parison, thereby forcing the glass against the walls of the blow mold, finishing the bottle. The boy again presses the foot treadle, and moves the table, etc., and a fresh parison is brought into position "F" to be blown, the mold containing the finished bottle moving to position G where it rests, allowing the glass of the finished bottle to become set during the blowing of the next parison, at the finish of which the boy again presses the pedal, moves the table, etc., and the mold containing the first finished bottle passes to position "H", where it is removed by a boy, from whom it is taken to the usual leer common in all glass factories.

In Fig. 15, we have shown a modified construction of our apparatus in which blank or parison molds and blow molds are carried by a single table 1ᵇ whereby the parison may be formed and blown to a finished bottle without shifting to a second table. The table 1ᵇ carries a series of parison or blank molds 4ª, alternating with a series of blow molds 145ª. A parison mold is charged at position "A'"; and the glass is forced down into the neck-ring or mold at this point, and around the core 30 to form the initial recess of the cavity. The table is then turned 90°, and the charged blank mold is brought to position "B'" where the glass is forced into the top of the mold; the cavity in the parison being enlarged at the same time. The table is then turned another quarter turn, bringing the finished parison into position "C'". When it reaches this position, it is taken out of the blank mold and transferred to a blow mold disposed in the position "D'". At the end of the next quarter turn of the table, the blow mold carrying the parison is brought to position "E'" where such parison is blown to a finished bottle; the same being removed at the end of the next quarter turn of the table which brings the blow mold with the finished bottle to position "F'".

We claim:

1. The combination, in a glass working machine, of a revoluble table, a series of blank molds carried thereby in permanently inverted position for receiving successively charges of glass, a series of removable neck molds in axial alinement with and embraced by said blank molds an air conducting closure for engagement successively with the upper ends of said molds to admit air under pressure thereto while the table occupies one of its positions, a closure below the table for registry with the opposite end of said molds while the blow head engages their upper end, said closure having a central projection coöperating with said neck molds and against which the glass is forced by the pressure from above to provide a recess in the neck end of a blank, an air conducting closure below the table for registry with the lower ends of the molds for admitting air under pressure thereto when the molds are moved to a second position by the operation of the table, the first air connection supplying fluid to force the glass into one end of the mold into substantially solid form with a recess in the neck end, and the second air connection supplying fluid to force a portion of the glass to the opposite end of the mold and counterblow the same into a blank of hollow form, and a cover plate operable above the table for engagement with the blank-molds against which the glass is raised by pressure from below.

2. In apparatus for manufacturing hollow glassware, the combination of a revoluble table, a series of permanently inverted blank-molds carried thereby, removable neck-molds for coöperative engagement with said blank-molds and embraced thereby, a reciprocative core axially disposed with respect to the lower ends of the blank molds, a blow-head for engagement with the upper ends of said blank-molds for forcing the charges of glass therein to one end of the same to form an initial recess and a finished head or neck, a second blow-head for forcing the glass to the opposite end of said blank-mold and simultaneously elongating the recess of the charges of glass therein, said second blow-head being below the table and alined with the second position of the blank-molds, and a closure for the upper ends of said blank-molds when the lower blow-head is in action.

3. In apparatus for manufacturing hollow glassware, the combination of a revoluble table, a permanently inverted blank-mold carried thereby, a removable neck-mold carried by said table for coöperative engagement with said blank-mold, the latter being apertured axially with respect to said molds, a reciprocative closure below the table having a core axially disposed with respect to the neck-mold when the table is in one position, a blow-head adapted for engagement with the upper end of said blank-mold when the core is in operative position, a second blow-head below the table for registry with the lower end of said blank-mold and a closure operable above the table for the upper end of said blank-mold when the lower blow-head is in action.

4. In apparatus for the manufacture of hollow glass ware, the combination of a revoluble table, a series of separable permanently inverted blank-molds mounted on top of said table and movable therewith, removable neck-molds coöperating with said blank-molds and carried by the table, the latter being apertured in line with the openings of the neck-molds and blank-molds, a vertically movable core below the table and axially disposed with respect to the blank molds and their coöperating neck molds when the table is in position to charge said blank-molds, fluid pressure means for moving said core into and out of operative position with respect to said neck-molds, a blow-head above the table and adapted to seat upon the upper ends of the blank-molds, means for raising and lowering said blow-head, a movable cover plate operable above the table for engagement with the upper ends of said charged blank-molds when they occupy the second position, a movable blow-head below the table in axial alinement with the table apertures below the lower ends of said changed blank-molds when the latter are in the second position, means for raising and lowering said second blow-head, and means for directing fluid pressure thereto to act upon the glass within said blank-molds.

5. The combination, in a glass working machine, of a revoluble table, a plurality of molds carried by said table for receiving successively charges of glass from which blanks are formed, said blanks being subsequently blown into hollow form, movable air delivering blow-heads brought into engagement with said molds above and below the table whereby fluid under pressure to act upon the charges of glass within the same may be directed thereto from a suitable source, means for controlling the pressure for operating said movable elements, means for simultaneously operating the several pressure controlling means, and independent means for directing pressure to the several molds.

6. The combination, in a glass working machine, of a plurality of molds, a revoluble table carrying said molds, the latter being movable to a plurality of relatively fixed positions, a core for axial alinement with said molds when in one position, means for operating said core, movable covering elements operable above and below the table for each end of the mold when in another position, means for moving said elements into engagement with said molds, one of said elements being in communication with a source of pressure for delivery to the charge of glass in the mold when in engagement therewith, and means for simultaneously removing said covering elements, the means for operating said covering elements not affecting the core or its operating means.

7. In apparatus for the manufacture of hollow glassware, the combination of a revoluble table, a mold carried thereby and movable to various positions in regular sequence, vertically operable elements above and below the table for engagement with each end of said mold when the same is in one position, means for effecting movement of said elements in one direction by fluid under pressure, a valve controlling the inlet and exhaust of such pressure, a treadle for operating said valve, one of said elements dropping away from the mold when the pressure is relieved, a spring for raising the other element from the mold, a latch for holding said treadle, and fluid operated means for releasing said latch.

In testimony whereof, we have signed our names to this specification in the presence of two subscribing witnesses.

HERBERT B. GARWOOD.
  FRANK H. GIBSON.
  CLINTON S. BUDD.
  HARRY H. HILYARD.
  WARD B. FOX.

Witnesses:
 O. W. CHARLESWORTH,
 JOHN P. NOLL.